United States Patent
Mota et al.

(10) Patent No.: US 10,917,803 B2
(45) Date of Patent: Feb. 9, 2021

(54) AUTOMATIC CHARACTERIZATION OF AP BEHAVIORS

(71) Applicant: Cisco Technology, Inc., San Jose, CA (US)

(72) Inventors: Javier Cruz Mota, Assens (CH); Jean-Philippe Vasseur, Saint Martin D'uriage (FR); Pierre-André Savalle, Rueil-Malmaison (FR); Grégory Mermoud, Veyras (CH)

(73) Assignee: Cisco Technology, Inc., San Jose, CA (US)

( * ) Notice: Subject to any disclaimer, the term of this patent is extended or adjusted under 35 U.S.C. 154(b) by 247 days.

(21) Appl. No.: 15/620,109

(22) Filed: Jun. 12, 2017

(65) Prior Publication Data

US 2018/0359651 A1 Dec. 13, 2018

(51) Int. Cl.
*H04W 24/08* (2009.01)
*H04W 24/02* (2009.01)
*H04W 88/08* (2009.01)

(52) U.S. Cl.
CPC .......... *H04W 24/08* (2013.01); *H04W 24/02* (2013.01); *H04W 88/08* (2013.01)

(58) Field of Classification Search
CPC ..... H04W 84/18; H04W 88/08; H04W 84/12; H04W 36/00; H04W 36/0083; H04W 40/28; H04W 40/30; H04W 48/18; H04W 48/20; H04W 52/0206; H04W 88/04; H04W 88/06; H04W 88/12; H04W 8/005; H04W 24/00; H04W 4/02; H04W 4/06; H04W 4/08; H04W 8/186; H04L 12/189; H04L 43/08; H04L 63/10; H04L 63/102; H04L 41/0893; H04L 47/13; Y04S 20/36; G06F 19/00; H04J 11/0093; Y02D 70/22; Y02D 70/23; Y10S 707/99945; Y10S 707/99948; Y10S 707/99943

See application file for complete search history.

(56) References Cited

U.S. PATENT DOCUMENTS

| | | | |
|---|---|---|---|
| 6,971,063 B1 * | 11/2005 | Rappaport | H04W 16/20 715/733 |
| 9,491,187 B2 | 11/2016 | Sridhara et al. | |
| 9,514,248 B1 * | 12/2016 | Guan | H04L 29/06 |
| 2004/0047320 A1 * | 3/2004 | Eglin | G06Q 50/24 370/338 |
| 2016/0198316 A1 | 7/2016 | Lakshmi Narayanan | |
| 2017/0006135 A1 | 1/2017 | Siebel et al. | |

FOREIGN PATENT DOCUMENTS

WO WO-2016008243 A1 1/2016

* cited by examiner

*Primary Examiner* — Yemane Mesfin
*Assistant Examiner* — Mon Cheri S Davenport
(74) *Attorney, Agent, or Firm* — Behmke Innovation Group; Kenneth J. Heywood; Jonathon P. Western

(57) ABSTRACT

In one embodiment, a device receives observed access point (AP) features of one or more APs in a monitored network. The device clusters the observed AP features within a latent space to form AP feature clusters. The device applies labels to the AP feature clusters within the latent space. The device uses the applied labels to the AP feature clusters to describe future behaviors of the one or more APs in the monitored network.

17 Claims, 17 Drawing Sheets

AUTOMATIC CHARACTERIZATION OF AP BEHAVIORS

TECHNICAL FIELD

The present disclosure relates generally to computer networks, and, more particularly, to the automatic characterization of access point (AP) behaviors.

BACKGROUND

Many network assurance systems rely on predefined rules to determine the health of the network. In turn, these rules can be used to trigger corrective measures and/or notify a network administrator as to the health of the network. For instance, in an assurance system for a wireless network, one rule may comprise a defined threshold for what is considered as an acceptable number of clients per access point (AP) or the channel interference, itself. More complex rules may also be created to capture conditions over time, such as a number of events in a given time window or rates of variation of metrics (e.g., the client count, channel utilization, etc.).

The number of wireless clients (e.g., laptops, tablets, etc.) in any given network is rapidly increasing and these clients are also becoming more and more mobile. Consequently, wireless clients are generating network conditions and behaviors that are constantly changing. Rule-based network assurance systems, such as those that apply rules to statistics on observed network metrics, are difficult to exploit and do not allow a quick overview of AP behaviors or troubleshooting of AP problems.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
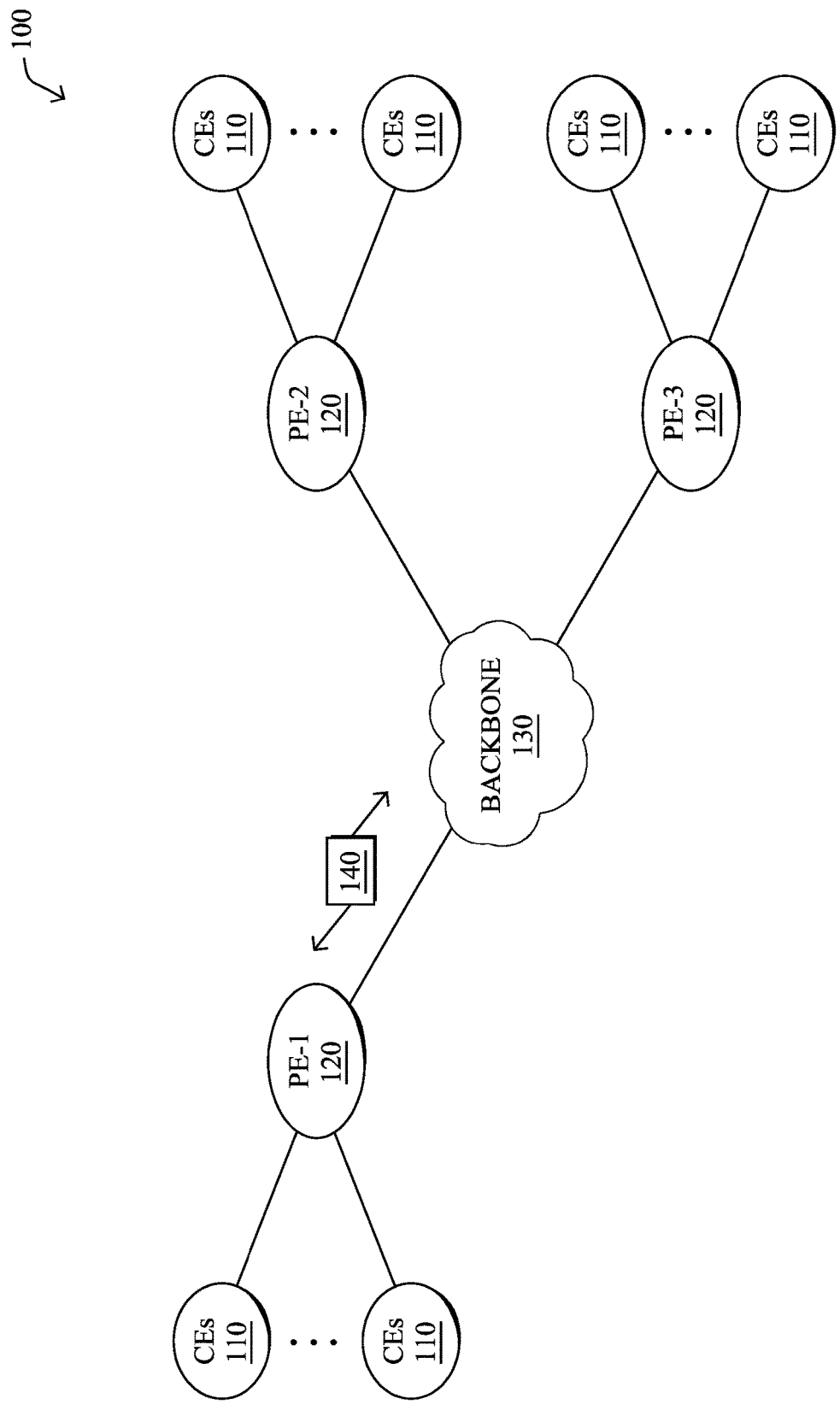
FIGS. 1A-1B illustrate an example communication network.

According to one or more embodiments of the disclosure, a device receives observed access point (AP) features of one or more APs in a monitored network. The device clusters the observed AP features within a latent space to form AP feature clusters. The device applies labels to the AP feature clusters within the latent space. The device uses the applied labels to the AP feature clusters to describe future behaviors of the one or more APs in the monitored network.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
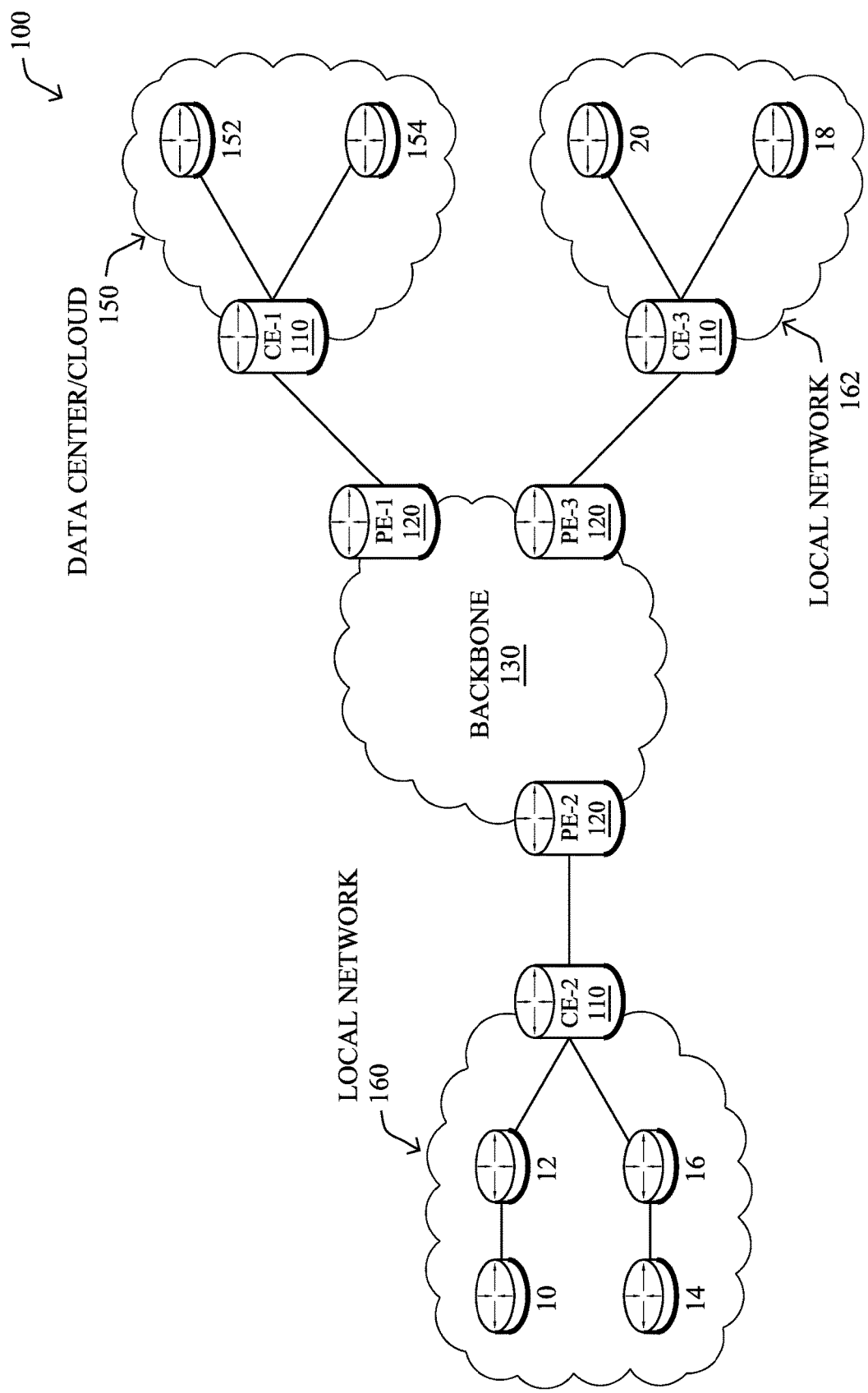

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
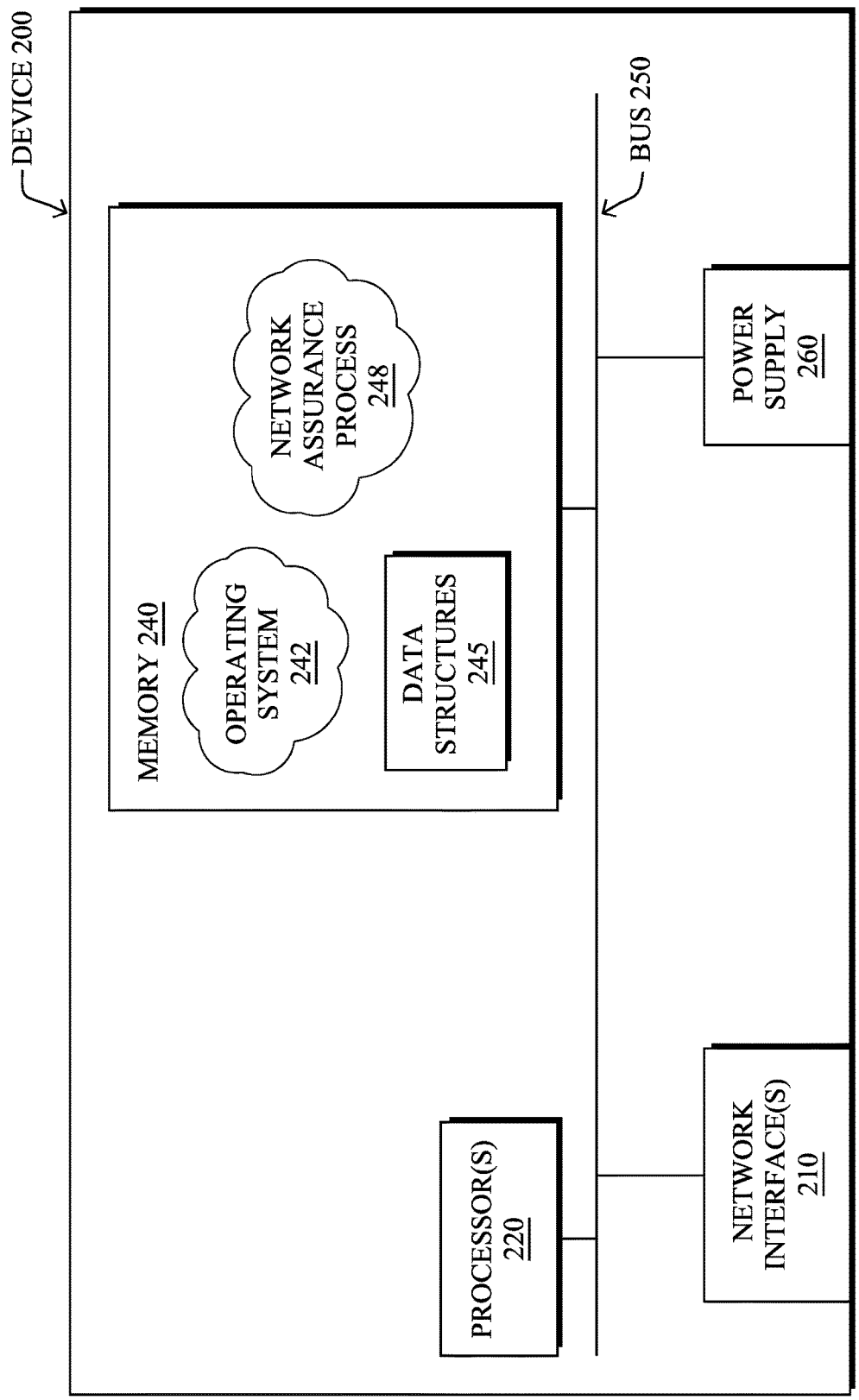
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason_code to the assurance system. To evaluate a rule regarding these conditions, the network assurance system may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
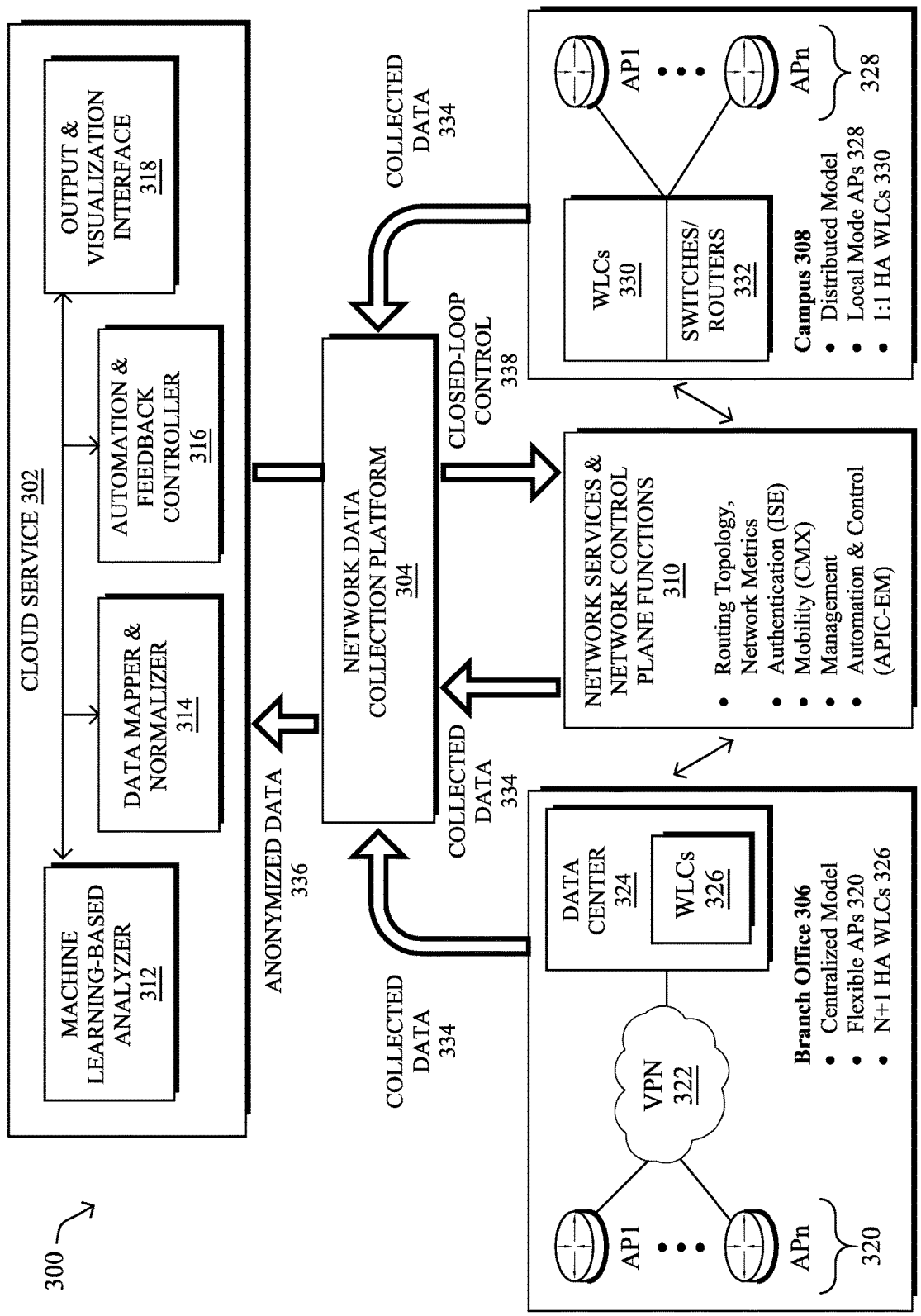
FIG. 3 illustrates an example network assurance system.

FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point AP1 through nth access point, APn) through which endpoint nodes may connect. Access points 320 may, in turn, be in communication with any number of wireless LAN controllers (WLCs) 326 located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point AP1 through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and the like. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint device, networking device in branch office 306 or campus 308, or a network service or control plane function 310, to adjust its operations (e.g., by signaling an endpoint to use a particular AP 320 or 328, etc.).

As noted above, the number of wireless clients (e.g., laptops, tablets, etc.) in any given network is rapidly increasing and these clients are also becoming more and more mobile. Consequently, wireless clients are generating network conditions and behaviors that are constantly changing. Rule-based network assurance systems, such as those that apply rules to statistics on observed network metrics, are difficult to exploit and do not allow a quick overview of AP behaviors or troubleshooting of AP problems.

Automatic Characterization of AP Behaviors

The techniques herein introduce a machine learning-based approach for AP behavior classification that can be implemented, e.g., in the cloud or as part of a local network service. In some aspects, the system may collect the required observation data from APs and/or WLCs, perform dimensionality reductions and clustering for joining similar AP behaviors, show information to network operators for collecting descriptions of behaviors, and perform machine learning on collected descriptions for automatically inferring descriptions of future behaviors.

Specifically, according to one or more embodiments of the disclosure as described in detail below, a device receives observed access point (AP) features of one or more APs in a monitored network. The device clusters the observed AP features within a latent space to form AP feature clusters. The device applies labels to the AP feature clusters within the latent space. The device uses the applied labels to the AP feature clusters to describe future behaviors of the one or more APs in the monitored network.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Operationally, FIGS. 4A-4G illustrate an example architecture 400 for the automatic characterization of access point (AP) behavior. As shown, architecture 400 may include any or all of the following components: a latent behavior modeler (LBM) 402, a latent trajectory analyzer (LTA) 404, a label collector (LC) 406, a behavior description learner (BDL) 408, and/or a behavior change detector (BCD) 410. In various embodiments, these components may be implemented within a network assurance system, such as system 300 shown in FIG. 3. For example, LBM 402 may receive collected AP observation data from network data collection platform 304 and provide processed data to output and visualization interface 318. Thus, in some embodiments, components 402-410 may be implemented as part of cloud service 302. However, in further embodiments, components 402-410 may be distributed across any of the different layers of network assurance system 300 (e.g., within network data collection platform 304, etc.).

A first aspect of architecture 400 is LBM 402 that is in charge of generating a low dimensional representation of AP behaviors. From time series of observable features characterizing an AP and collected by network data collection platform 304, LBM 402 may compute a representation of all these features in a much more compact space (e.g., in terms of dimensions and concentration of values), referred to herein as the "latent space."

Figure 4A:
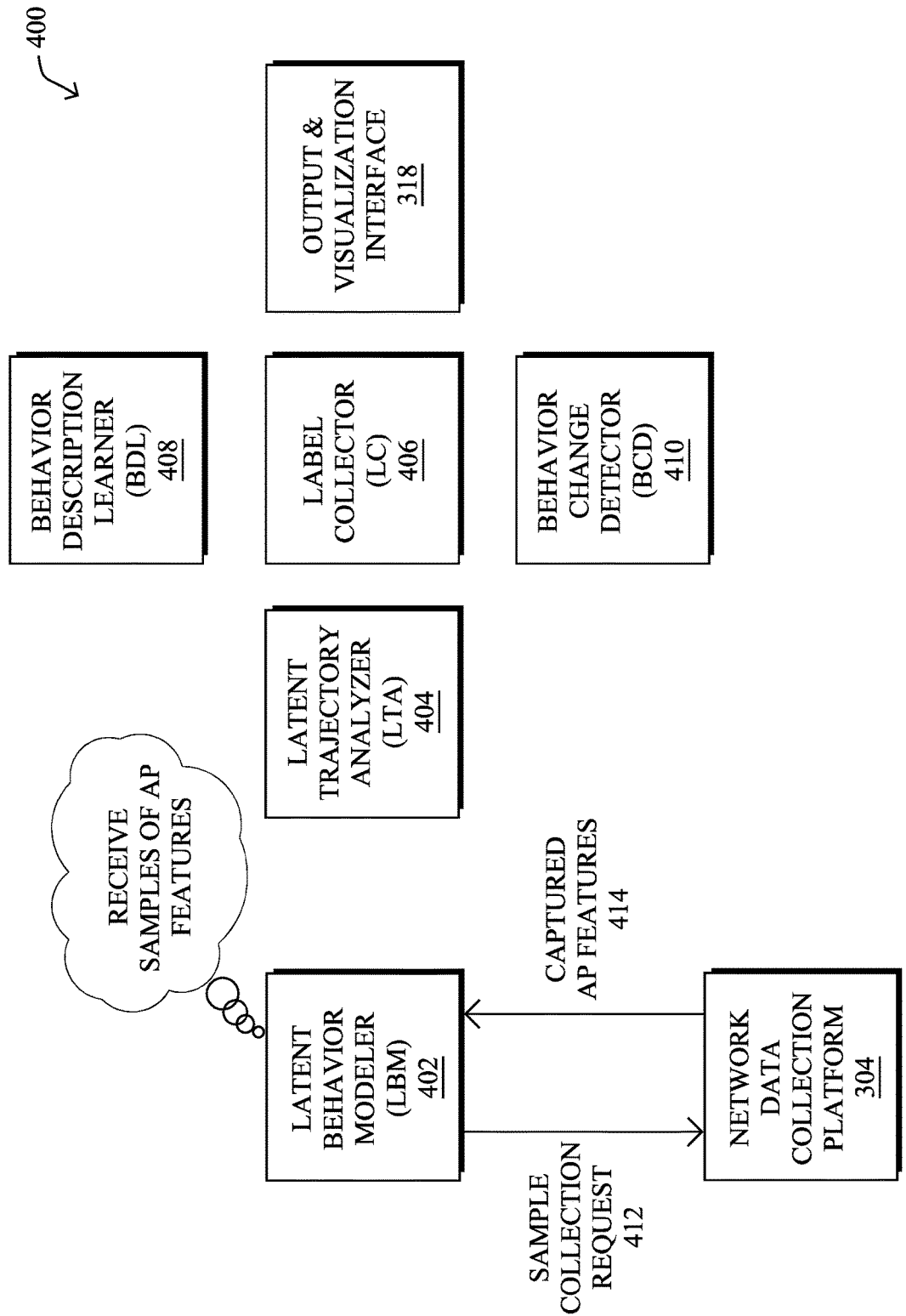
FIGS. 4A-4G illustrate an example architecture for the automatic characterization of access point (AP) behavior.

For example, as shown in FIG. 4A, LBM 402 may receive captured AP features 414 from network data collection platform 304 that, in turn, collects the AP feature data from the various APs, WLCs, or the like, in the monitored network (e.g., from APs 320, 328, WLCs 326, 330, etc.). In cases, in which LBM 402 is not collocated with network data collection platform 304, LBM 402 may request AP features 414 by sending a new sample collection request 412 to network data collection platform 304. In various embodiments, request 412 may specify information used by network data collection platform 304 to collect the AP feature data from the various APs and/or other networking equipment in the monitored network. For example, request 412 may specify the frequency of data collection by platform 304, the set of AP features of interest, or the like.

In general, captured AP features 414 may include data regarding the observed state of one or more wireless APs in the monitored network. AP features 414 can be gathered using a variety of techniques such as in-band networking using SNMP, WSA JSON, etc. for features from an AP or WLC and/or both in-band and out-of-band (e.g. 802.11k/v) techniques for features gathered from end-devices. Such data may include, but is not limited to, any or all of the following features:
  channel width
  frequency band
  power level
  number of clients
  Reception (RX) bytes
  Transmission (TX) bytes
  noise level
  radio metrics about how a client is perceived by the AP to which it is connected or by neighboring APs
  device type.

Figure 4B:
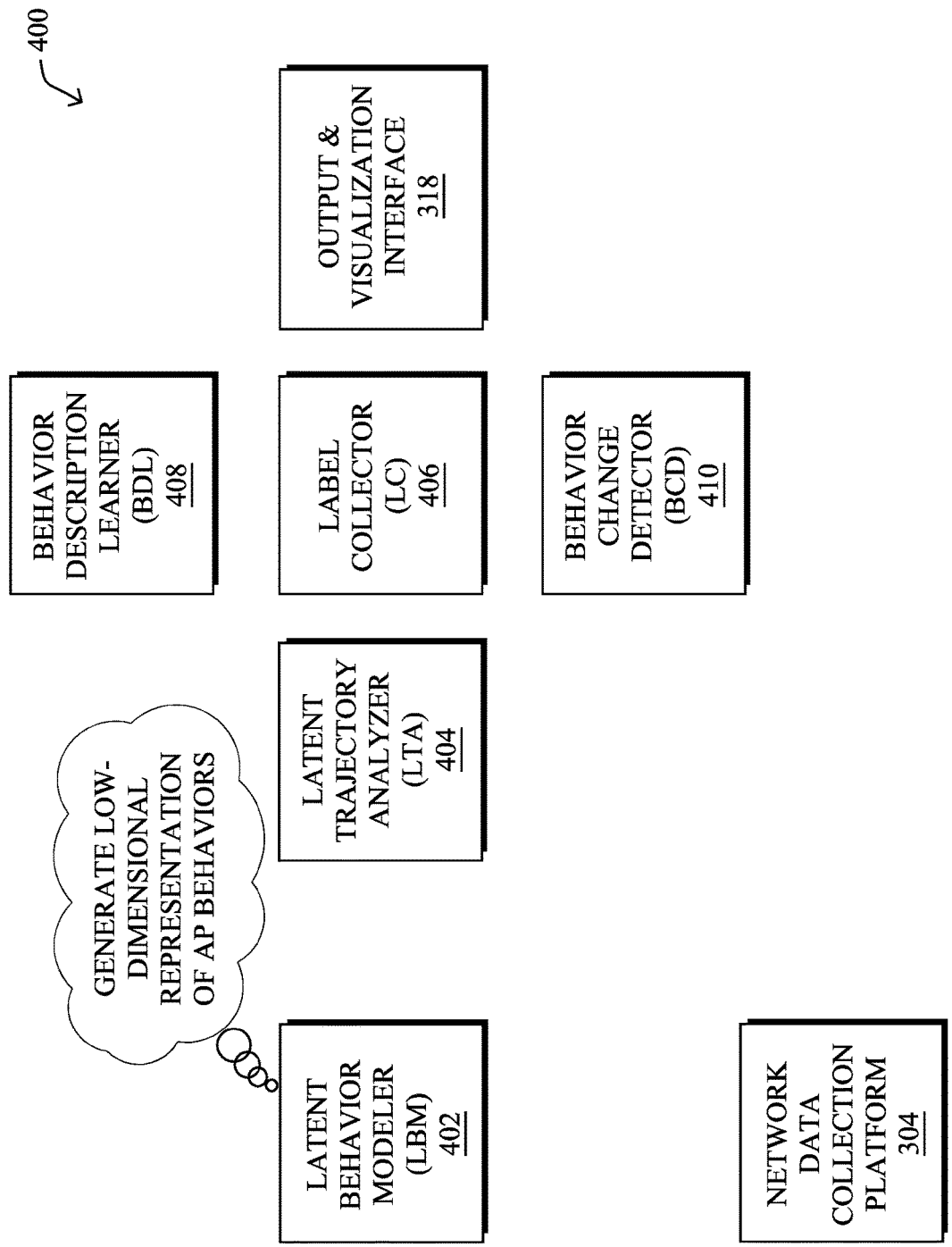
Figure 4C:
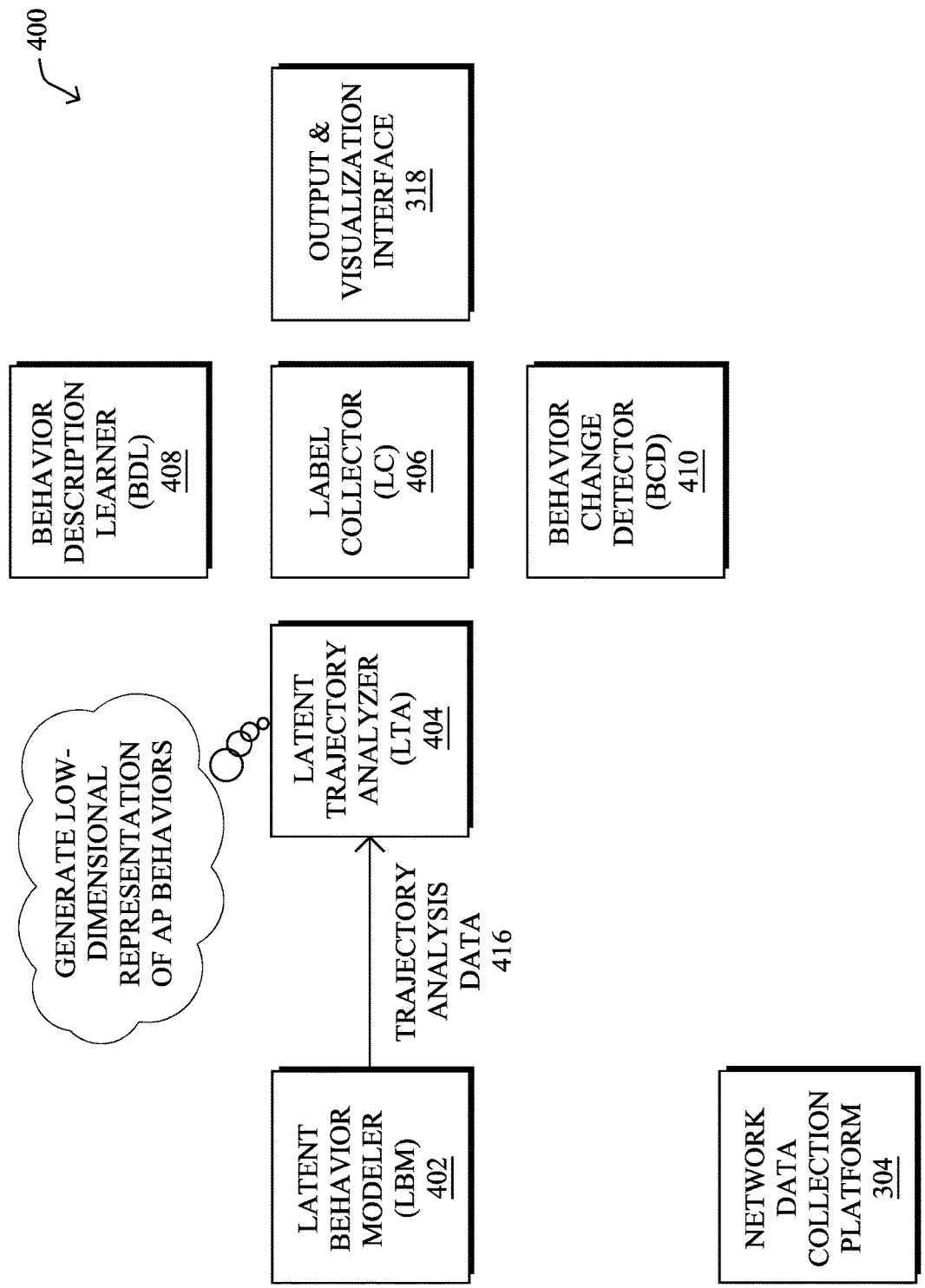

As shown in FIG. 4B, LBM 402 may use the received AP features 414 to generate the latent space, which is a low-dimensional representation of the AP behaviors. Notably, preliminary testing has shown that APs with similar statistical behaviors will be concentrated in the same regions of the latent space and/or will follow similar trajectories in the latent space. A more detailed discussion of trajectories in the latent space appears below. LBM 402 may employ any suitable approach to perform the dimensionality reduction. For example, suitable approaches may include, but are not limited to, principal component analysis (PCA), autoencoders, recurrent neural networks (RNNs), and the like.

LBM 402 may take any number of different approaches to performing the dimensionality reduction of AP features 414, in order to form the latent space. In one embodiment, LBM 402 forms the latent space by performing a "point to point" embedding between samples from the original space of AP features 414, to samples in the latent space. This means that a time series of length N that includes samples of features from a certain AP (e.g., $x_1, x_2, x_3, \ldots, x_N$), with each $x_i$ being an m-dimensional vector, is converted by LBM 402 to a time series of the same length (N) of samples in the latent space (e.g., $s_1, s_2, s_3, \ldots, s_N$), with each $s_i$ being an r-dimensional vector, and r<m. In another embodiment, LBM 402 may perform a "sequence to point" embedding between sequences of a predefined size (e.g., in terms of duration or number of samples) in the original space of AP features 414, to a single sample in the latent space. This means that a time series of length N containing samples of features from a certain AP (e.g., $x_1, x_2, x_3, \ldots, x_N$), is converted by LBM 402 to a single sample in the latent space (s). In yet another embodiment, LBM 402 performs a "sequence to sequence" embedding between time series of length N containing samples of features from a certain AP (e.g., $x_1, x_2, x_3, \ldots, x_N$), to sequences of length M containing samples in the latent space (e.g., $s_1, s_2, s_3, \ldots, s_M$). By way of example, an RNN can perform an embedding into the latent space in any of these modes of operation.

In general, a sequence of consecutive points in the latent space, corresponding to a single AP, is referred to herein as a trajectory. Indeed, a trajectory is a sequence $(s_1, s_2, \ldots, s_T)$ which is the result of either computing a "point to point" embedding of a series of T observed samples, or a "sequence to point" embedding applied on T chunks of a series of N observed features (with N being greater than T), or several "sequence to sequence" embeddings applied to chunks of a series of N observed features (with N being greater than T), or any combination of these embedding modes.

Figure 5A:
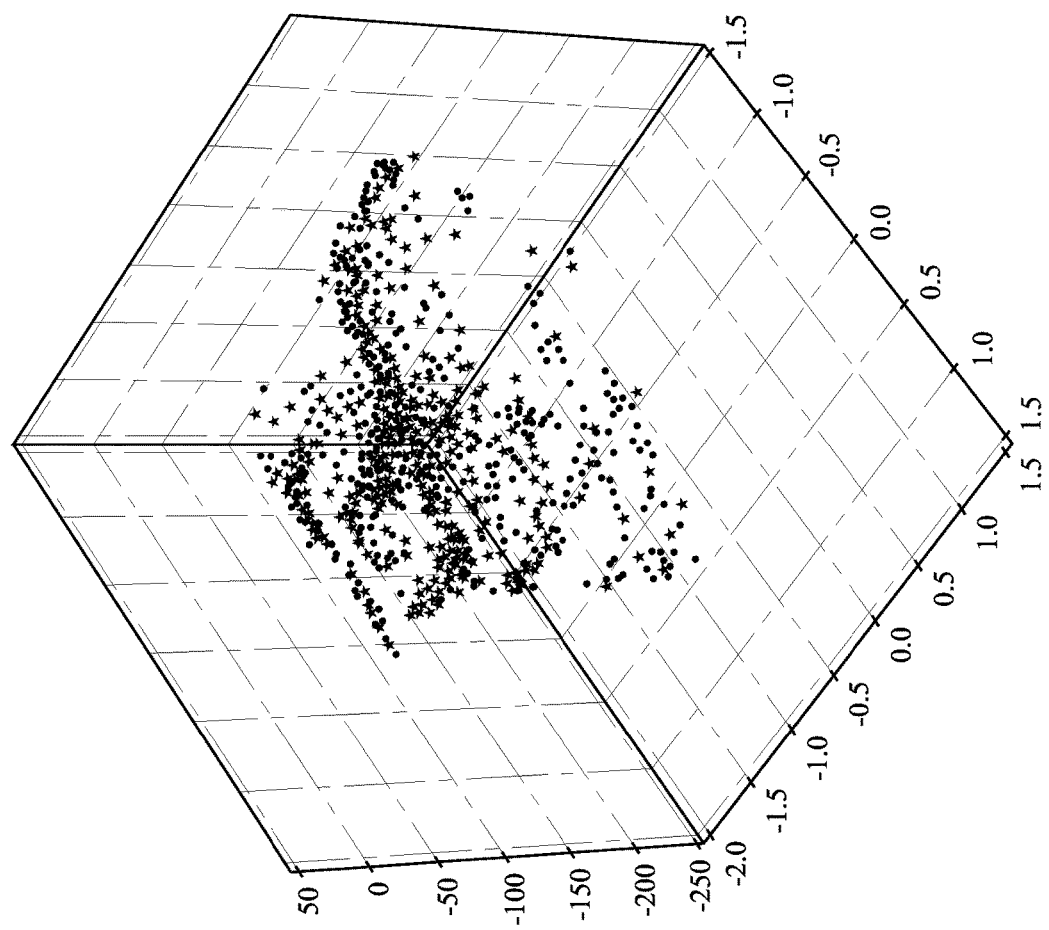
FIGS. 5A-5B illustrate examples of trajectories in a latent space.
Figure 5B:
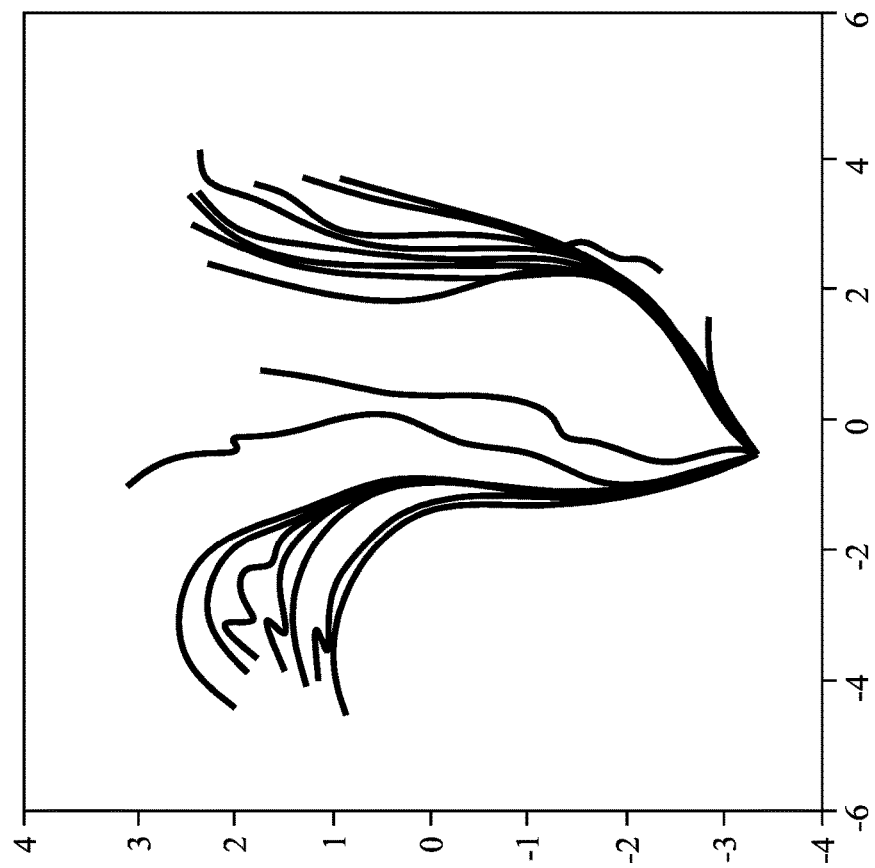

Referring briefly to FIGS. 5A-5B, examples are shown of the data that may be generated by LBM 402. In FIG. 5A, an example latent space 500 is shown that maps AP features 414 to points in a three dimensional space, using the one of the embedding techniques above. In FIG. 5B, an example trajectory 510 is shown that represents a single AP and includes a set of consecutive points in latent space 500 for the AP.

Referring again to FIG. 4C, a second aspect of the techniques herein is LTA 404 that analyzes the trajectories in the latent space generated by LBM 402 based on the observed AP feature data 414. In various embodiments, LTA 404 may perform any or all of the following operations:
 1. Compute a clustering of trajectories;
 2. Define groups of APs based on the result of the clustering of trajectories;
 3. Compute a clustering of individual points in trajectories;
 4. Define groups of samples based on the result of the clustering of individual points in trajectories.

For these two clustering steps above, LTA 404 may employ any number of different clustering approaches such as DBSCAN, k-means, mean-shift, etc. These clustering operations result in the following cluster groups:
  APs that behaves similarly across time (for the clustering applied on trajectories); and Periods of time while several APs were behaving similarly (for the clustering applied on individual points in trajectories).

Since LBM 402 and LTA 404 may not be collocated, in some implementations, a trajectory analysis data message 416 may be sent by LBM 402 to report data regarding the latent space to LTA 404.

Figure 4D:
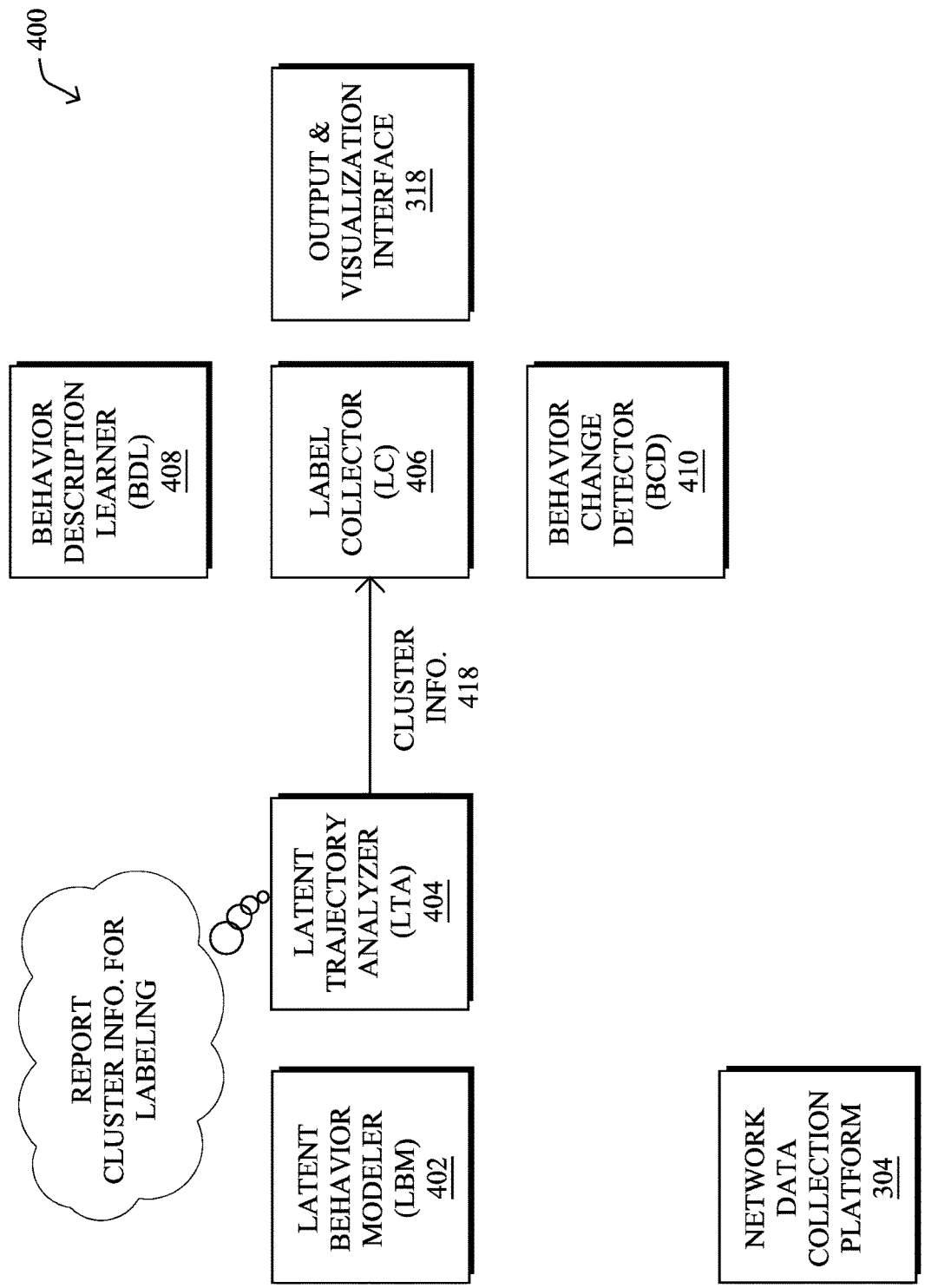
Figure 4E:
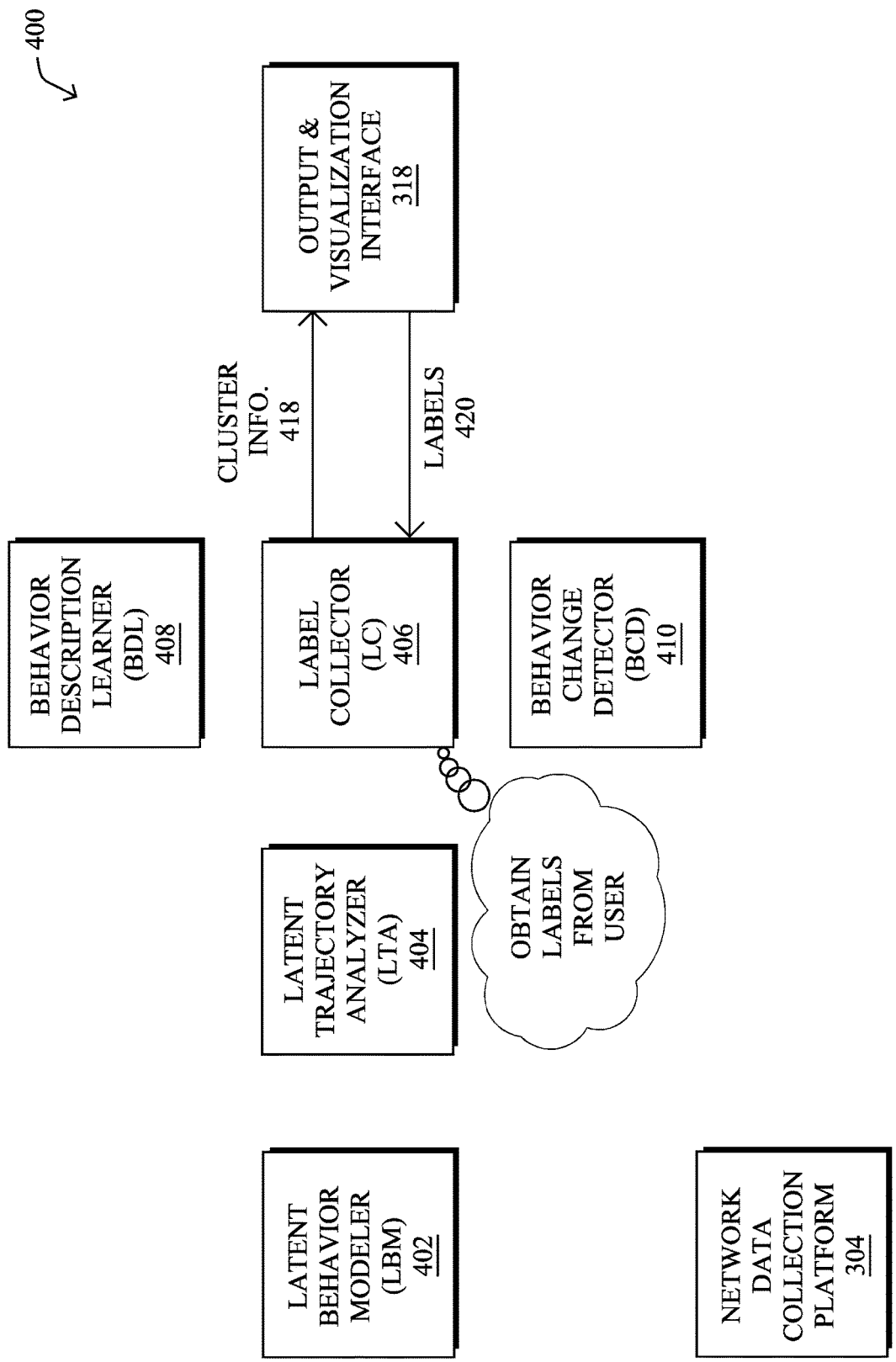

A third aspect of the techniques herein is LC 406 that is in charge of showing to the user the results of the different clustering procedures performed by LTA 404 in an explanatory and interpretable way, as well as collecting information associated by users to these clusters. For example, as shown in FIG. 4D, LTA 404 may report its resulting cluster information 418 to LC 406 for labeling. In turn, as shown in FIG. 4E, LC 406 may provide cluster information 418 to output and visualization interface 318 (e.g., a user interface), thereby allowing the user to define labels 420 for use by LC 406.

The result of the labeling process by LC 406 may be a database that includes any or all of the following information in each entry:

Id of the described cluster;

Id of the user providing the label information 420;

Information associated by the user to the cluster; and/or

Timestamp of the information.

In one embodiment, LC 406 shows a predefined and limited set of labels 420 that can be associated by users to clusters. In this case, the user can only choose one or more options amongst the options shown, for instance "high peaks of users+low throughput users+high noise". In another embodiment, LC 406 collects free-form text introduced by the user for describing a particular cluster. In this case, users are not restricted to specific descriptions. For example, such a description could be "this AP usually has low number of clients but that download big amounts of data." In yet another embodiment, LC 406 may collect audio from users describing a particular cluster. As in the previous embodiment, the users are not restricted to any specific description.

Figure 6A:
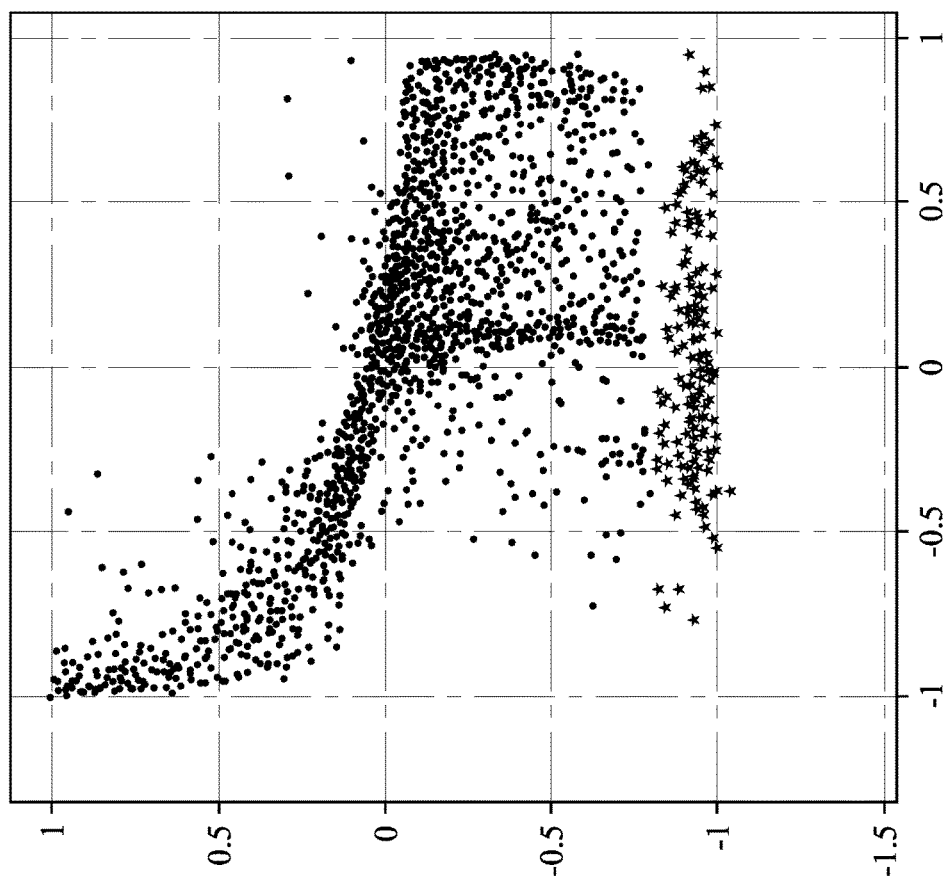
FIGS. 6A-6E illustrate example plots of AP feature data.
Figure 6B:
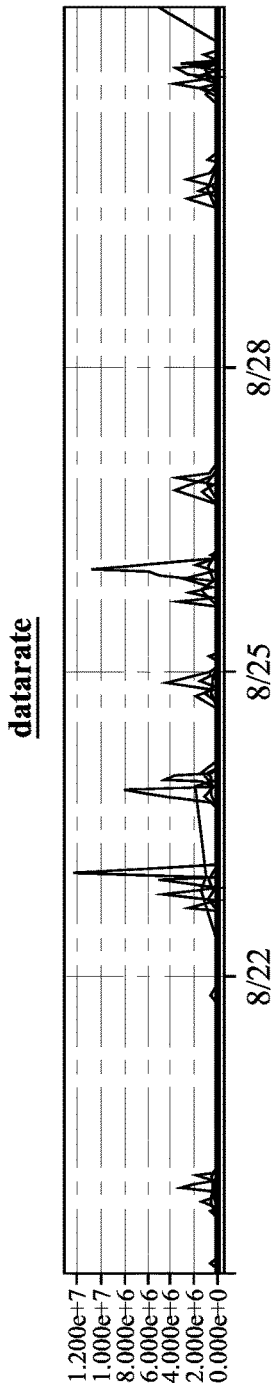
Figure 6C:
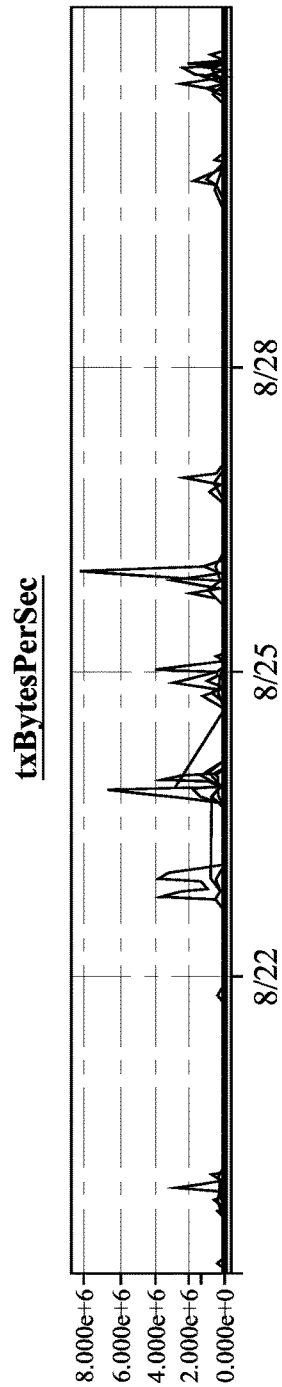
Figure 6D:
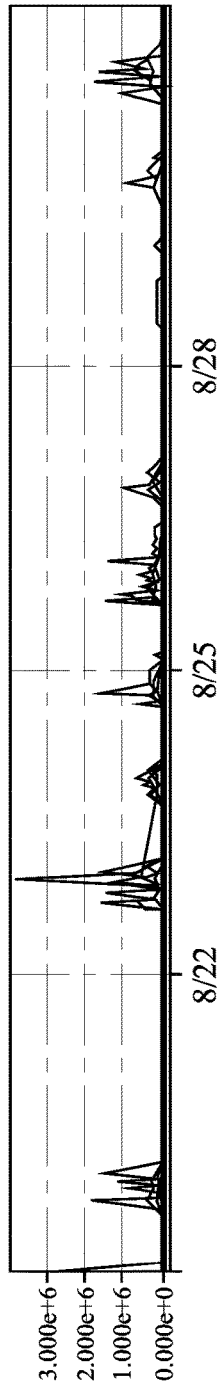
Figure 6E:
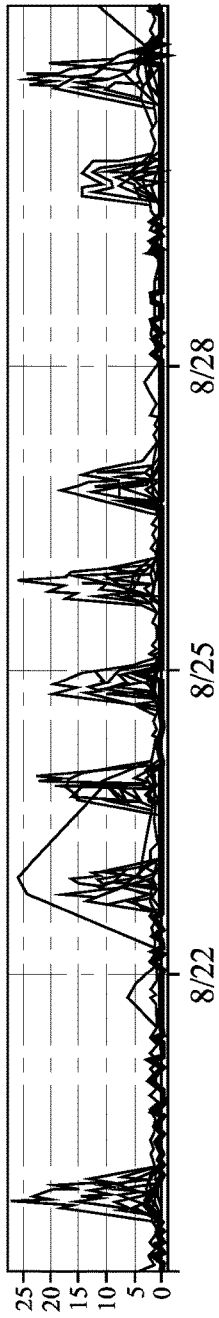

Referring briefly to FIGS. 6A-6E, example plots are shown of the operations of LC 406. In particular, FIG. 6A illustrates an example plot 600 of samples within the latent space generated by LBM 402. Likewise, FIGS. 6B-6E illustrate example feature plots 610-640 for the different AP features observed (e.g., AP data rate, AP transmission bytes per second, AP reception bytes per second, and count of clients attached to the AP, respectively). Note that feature plots 610-640 demonstrate the changes in their respective features over time for the AP. During operation, LC 406 may present any of plots 600-640 to an electronic display, thereby allowing the user to label the points, accordingly (e.g., by labeling calm periods in plots 610-640, etc.).

Figure 4F:
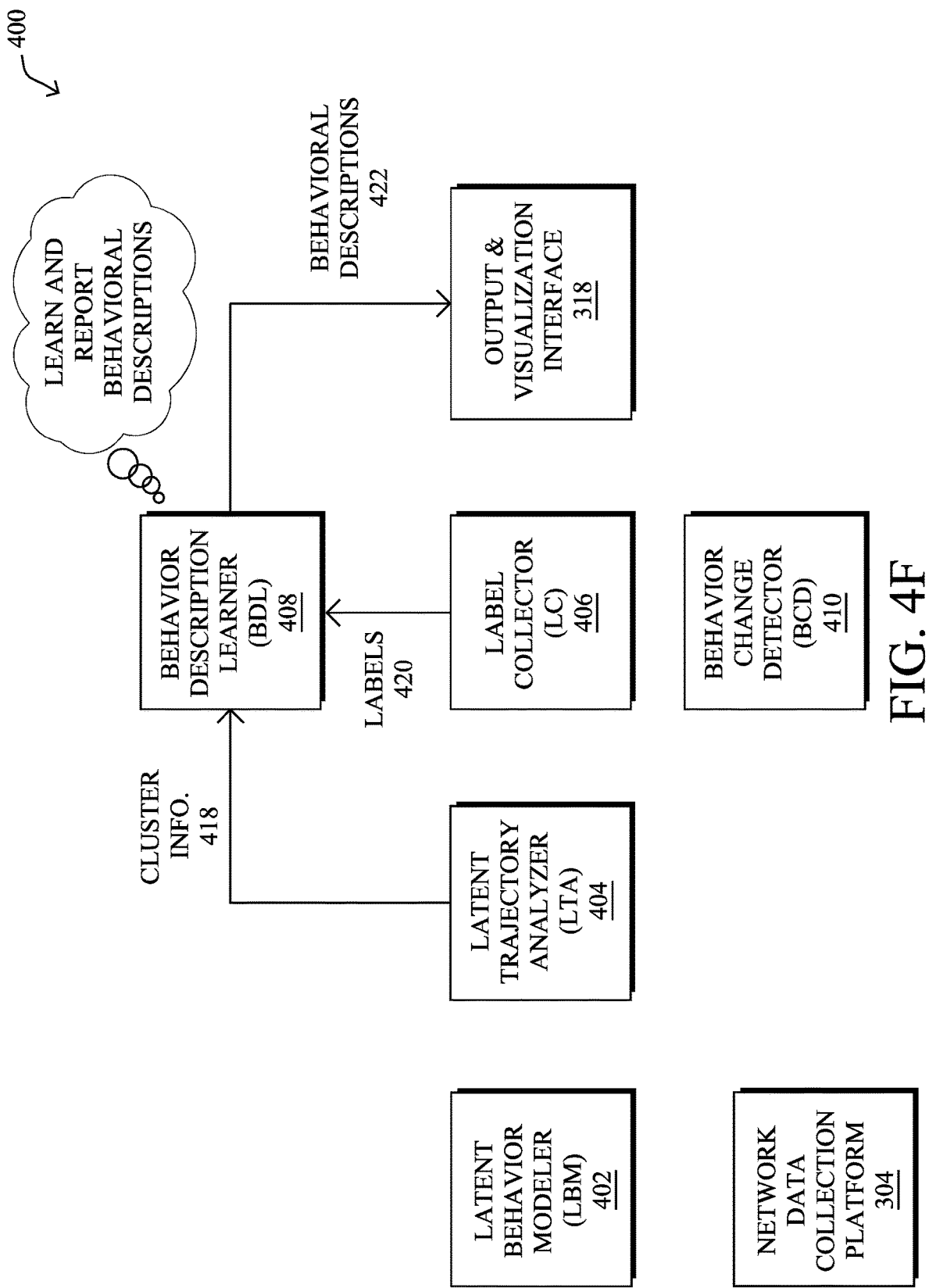
Figure 4G:
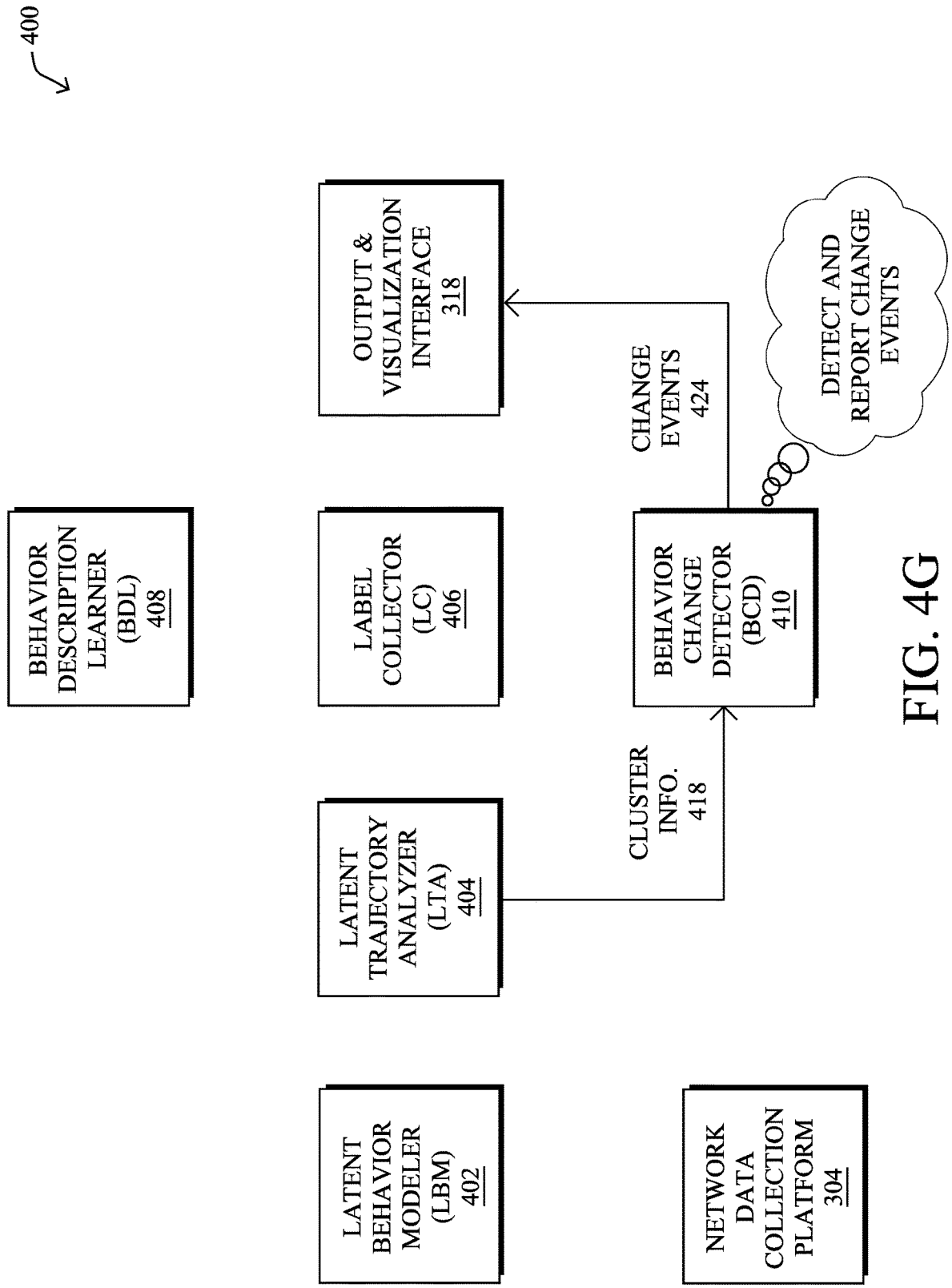

Referring now to FIG. 4F, a fourth aspect of the techniques herein is BDL 408 that is in charge of learning, from the database collected by LC 406 (e.g., labels 420) and the clustering result information 418 from LTA 404, a model configured to generate descriptions of clusters in the latent space. The resulting model(s) can be used by an AP monitoring tool for automatically describing to the operator the behavioral characteristics of an AP and/or how a particular AP behaved during a certain period of time. For example, using its models, BDL may provide behavioral descriptions 422 to interface 318 that describe subsequent AP behaviors observed in the future.

In various embodiments, the operations performed by BDL 408 are as follows:
1. Unify information about clusters:
   a. Convert information from predefined labels 420 into predefined text descriptions
   b. Process audio information for generating text descriptions
2. At this point, all the information is in the form of text. Then, perform a training with a machine learning-based process having input features that are the points in the state space and/or the points in the original feature space of the AP, and whose output target are text descriptions. Note that a very well suited approach for this kind of problem are neural networks, which are widely used for Natural Language Processing (NLP) problems, such as for automatic caption generation from images.

In one embodiment, the training is performed using data coming from all users of interface 318. In another embodiment, BDL 408 may compute one model per user, which allows the model to mimic the descriptions that would be generated by each individual user. In yet another embodiment, groups of users can be defined and BDL 408 may train one model per group of users.

In FIG. 4F, a fifth component of the techniques herein is BCD 410 that may additionally be used to detect when the behavior of an AP is changing, based on the output cluster information 418 of LTA 404. When a recent time chunk of an AP is assigned to a cluster with different characteristics than before (e.g., different summary statistics or different members), BCD 410 reports a change event to the user via interface 318. In various embodiments, BCD 410 may report all events, or use additional machine learning and statistical modelling to filter out these events, possibly by gathering implicit (e.g., time spent looking at events on UI) or explicit feedback from the user. In one embodiment, BCD 410 may put more importance to change events where the AP is now alone in its cluster, or in a cluster with a very small population overall, indicating an outlying behavior.

Figure 7:
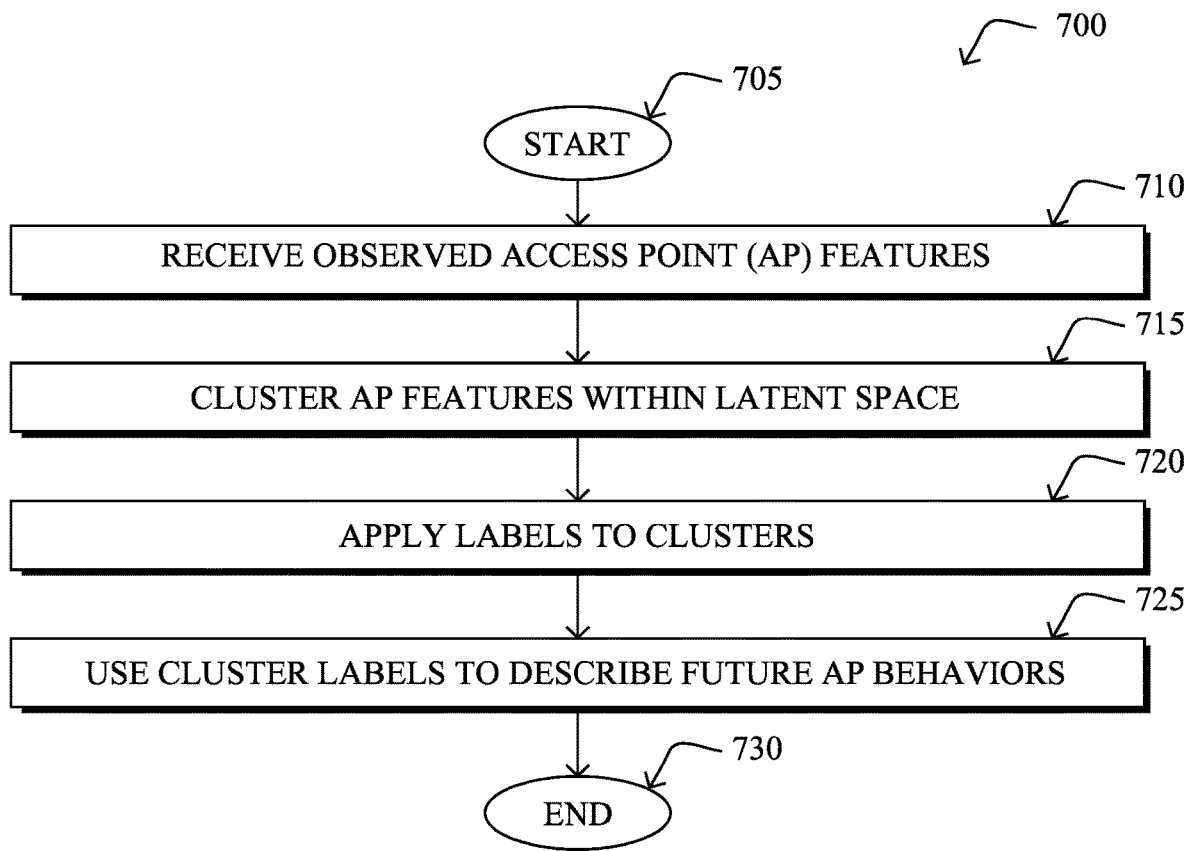
FIG. 7 illustrates an example simplified procedure for automatically characterizing AP behaviors.

FIG. 7 illustrates an example simplified procedure for automatically characterizing AP behaviors in a network in accordance with one or more embodiments described herein. For example, a non-generic, specifically configured device (e.g., device 200) may perform procedure 700 by executing stored instructions (e.g., process 248). The procedure 700 may start at step 705, and continues to step 710, where, as described in greater detail above, the device may receive observed access point (AP) features regarding one or more APs in a monitored network. As noted above, such feature data may include channel width, frequency band, power level, number of clients, RX bytes, TX bytes, noise level, radio metrics about how a client is perceived by the AP to which it is connected or by neighboring APs, and/or a device type.

At step 715, as detailed above, the device may cluster the AP features within a latent space. In some embodiments, the latent space may be formed via a dimensionality reduction of the input AP features. In various embodiments, the clustering may be performed in part by performing point to point embedding, point to sequence embedding, or sequence to sequence embedding. In further embodiments, the device may compute clusters of the trajectories present in the latent space and/or clusters of individual points in the trajectories.

At step 720, the device may apply labels to the clusters from step 715, as described in greater detail above. In some cases, the labels may be received by the device from a user interface. For example, the device may present the cluster information to a user interface and, in response, receive label information from the user interface (e.g., text, audio, etc.).

At step 725, as detailed above, the device may use the cluster labels from step 720 to describe future behaviors of the AP(s). For example, the device may use the labels to train a machine learning model. In turn, this trained model can be used to label further observed features of the AP(s), to label the behavior of the AP(s). Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for a network assurance system to monitor, troubleshoot, and operate APs in a monitored network. Notably, the techniques herein represent a paradigm shift in understanding AP behaviors with the following objectives in mind:
- quickly and efficiently describe behaviors of AP while taking into account a large number of dimensions and signals
- show to network operators compact, explanatory, and interpretable information about AP behaviors
- collect feedback about AP behaviors from network operators
- learn to infer human-readable descriptions of AP behaviors While there have been shown and described illustrative embodiments that provide for the automatic characterization of AP behaviors, it is to be understood that various other adaptations and modifications may be made within the spirit and scope of the embodiments herein. For example, while certain embodiments are described herein with respect to using certain types of machine learning models, the models are not limited as such and may be used for other functions, in other embodiments. In addition, while certain protocols are shown, such as BGP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments is herein.

What is claimed is:

1. A method comprising:
   receiving, at a device, observed access point (AP) features of one or more APs in a monitored network;
   clustering, by the device, the observed AP features within a three-dimensional latent space model to form AP feature clusters, wherein the observed AP features include data regarding an observed state of one or more wireless APs in the monitored network and the AP feature clusters are indicative of a plurality of APs that have similar AP behavioral patterns, and wherein the clustering of the observed AP features within the latent space model comprises representing sequences of consecutive points in the latent space model, which correspond to a single AP of the one or more APs, as trajectories;
   applying, by the device, user defined labels to the AP feature clusters within the latent space model; and
   using, by the device, the applied labels to the AP feature clusters to describe future behavioral patterns of the one or more APs in the monitored network.

2. The method as in claim 1, wherein clustering the observed AP features within the latent space model comprises:
   performing, by the device, a point to point embedding of samples of the observed AP features to samples in the latent space model.

3. The method as in claim 1, wherein clustering the observed AP features within the latent space model comprises:
   performing, by the device, a sequence to point embedding of a sequence of the observed AP features to a single sample in the latent space model.

4. The method as in claim 1, wherein clustering the observed AP features within the latent space model comprises:
   performing, by the device, a sequence to sequence embedding of a sequence of the observed AP features to a sequence of samples in the latent space model.

5. The method as in claim 1, wherein clustering the observed AP features within the latent space model further comprises:
   computing, by the device, clusters of the trajectories in the latent space model; and
   using, by the device, the clusters of the trajectories to define groups of the APs.

6. The method as in claim 1, wherein clustering the observed AP features within the latent space model further comprises:
   computing, by the device, clusters of individual points in the trajectories in the latent space model; and
   using, by the device, the clusters of the individual points in the trajectories to identify similar behavioral patterns across two or more of the APs.

7. The method as in claim 1, wherein applying the labels to the AP feature clusters within the latent space model comprises:
   providing, by the device, data regarding the AP feature clusters to a user interface; and
   receiving, at the device, label information from the user interface for the AP feature clusters.

8. The method as in claim 1, further comprising:
   detecting, by the device, a change in one of the AP feature clusters; and
   reporting, by the device, the detected change to a user interface.

9. An apparatus, comprising:
   one or more network interfaces to communicate with a network;
   a processor coupled to the network interfaces and configured to execute one or more processes; and
   a memory configured to store a process executable by the processor, the process when executed configured to:
   receive observed access point (AP) features of one or more APs in a monitored network;

cluster the observed AP features within a three-dimensional latent space model to form AP feature clusters, wherein the observed AP features include data regarding an observed state of one or more wireless APs in the monitored network and the AP feature clusters are indicative of a plurality of APs that have similar AP behavioral patterns, and wherein the clustering of the observed AP features within the latent space model comprises representing sequences of consecutive points in the latent space model, which correspond to a single AP of the one or more APs, as trajectories;

apply user defined labels to the AP feature clusters within the latent space model; and use the applied labels to the AP feature clusters to describe future behavioral patterns of the one or more APs in the monitored network.

10. The apparatus as in claim 9, wherein the apparatus clusters the observed AP features within the latent space model by:

performing a point to point embedding of samples of the observed AP features to samples in the latent space model.

11. The apparatus as in claim 9, wherein the apparatus clusters the observed AP features within the latent space model by:

performing a sequence to point embedding of a sequence of the observed AP features to a single sample in the latent space model.

12. The apparatus as in claim 9, wherein the apparatus clusters the observed AP features within the latent space model by:

performing a sequence to sequence embedding of a sequence of the observed AP features to a sequence of samples in the latent space model.

13. The apparatus as in claim 9, wherein the apparatus clusters the observed AP features within the latent space model further by:

computing clusters of the trajectories in the latent space model; and using the clusters of the trajectories to define groups of the APs.

14. The apparatus as in claim 9, wherein the apparatus clusters the observed AP features within the latent space model further by:

computing clusters of individual points in the trajectories in the latent space model; and using the clusters of the individual points in the trajectories to identify similar behavioral patterns across two or more of the APs.

15. The apparatus as in claim 9, wherein the apparatus applies the labels to the AP feature clusters within the latent space model by:

providing data regarding the AP feature clusters to a user interface; and receiving label information from the user interface for the AP feature clusters.

16. The apparatus as in claim 9, wherein the process when executed is further configured to:

detect a change in one of the AP feature clusters; and report the detected change to a user interface.

17. A tangible, non-transitory, computer-readable medium storing program instructions that cause a device to execute a process comprising:

receiving, at the device, observed access point (AP) features of one or more APs in a monitored network;

clustering, by the device, the observed AP features within a three-dimensional latent space model to form AP feature clusters, wherein the observed AP features include data regarding an observed state of one or more wireless APs in the monitored network and the AP feature clusters are indicative of a plurality of APs that have similar AP behavioral patterns, and wherein the clustering of the observed AP features within the latent space model comprises representing sequences of consecutive points in the latent space model, which correspond to a single AP of the one or more APs, as trajectories;

applying, by the device, user defined labels to the AP feature clusters within the latent space model; and using, by the device, the applied labels to the AP feature clusters to describe future behavioral patterns of the one or more APs in the monitored network.

* * * * *

UNITED STATES PATENT AND TRADEMARK OFFICE
CERTIFICATE OF CORRECTION

PATENT NO. : 10,917,803 B2
APPLICATION NO. : 15/620109
DATED : February 9, 2021
INVENTOR(S) : Javier Cruz Mota et al.

It is certified that error appears in the above-identified patent and that said Letters Patent is hereby corrected as shown below:

In the Specification

Column 15, Line 58, please amend as shown:
embodiments herein.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*